Dec. 22, 1925.
J. R. STACK
1,566,352
PROCESS OF RECOVERING TIN FROM ORES
Filed May 23, 1919
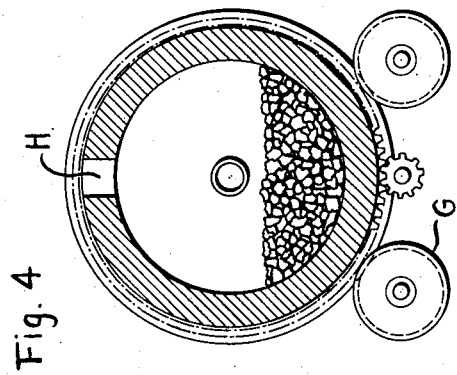
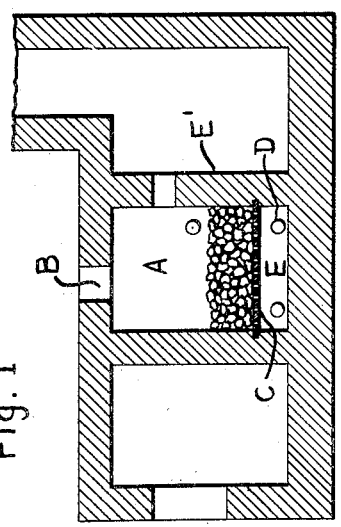
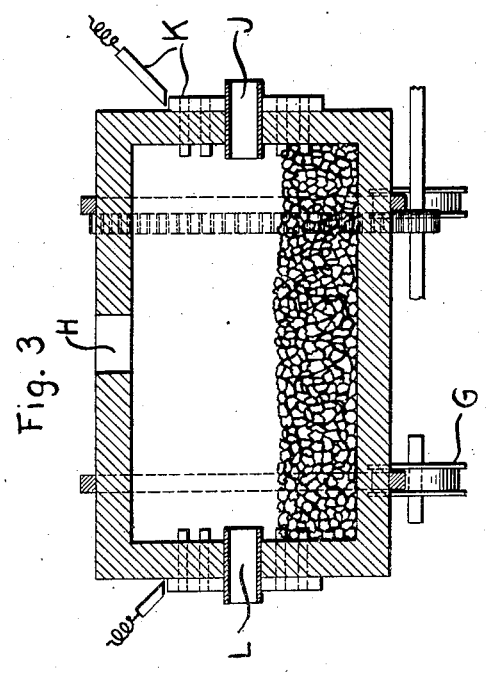
Inventor
James R. Stack
By his Attorneys
Messimer Austin Patented Dec. 22, 1925.

1,566,352

UNITED STATES PATENT OFFICE.

JAMES R. STACK, OF PERTH AMBOY, NEW JERSEY, ASSIGNOR TO AMERICAN SMELTING AND REFINING COMPANY, OF NEW YORK, N. Y., A CORPORATION OF NEW JERSEY.

PROCESS OF RECOVERING TIN FROM ORES.

Application filed May 23, 1919. Serial No. 299,237.

*To all whom it may concern:*

Be it known that I, JAMES R. STACK, a citizen of the United States, and resident of Perth Amboy, in the county of Middlesex and State of New Jersey, have invented certain new and useful Improvements in Processes of Recovering Tin from Ores, of which the following is a specification.

The invention relates to the art of recovering metallic tin from ores, concentrates and by-products carrying the same, and relates particularly to a process of extracting tin without using a reverberatory or a blast furnace.

Heretofore it has been necessary in order to extract tin from its ores to treat the same in a suitable furnace with a mixture of reducing material such as coke, coal, culm or carbonaceous material at a relatively high temperature, and owing to the impurities always present in tin bearing ores it has always been necessary to treat the slag from the furnace at least once, and frequently more often in order to recover the tin mixed therewith.

One of the primary objects of my invention is to treat tin bearing ores in such a manner that the tin oxide will be reduced when the ore is at a relatively low temperature compared with the heat necessary in reverberatory or blast furnace practice.

A further object of the invention is to reduce the tin oxide without using coal, coke or similar reducing material, or flux mixed with the charge.

Various other objects and advantages of the invention will be in part obvious from the following description of the process and the invention also consists in certain new and novel steps of the process hereinafter set forth and claimed.

It is well known of course that the oxides of certain metals may be reduced by passing over them a stream of hydrogen gas or other reducing gases as CO or $CO_2$ but heretofore no practical method has been discovered for utilizing this principle in actual work on a commercial scale in the production of metallic tin.

According to my invention the ore, ore concentrates or other material to be treated is first crushed to a relatively small size, for example, one-half inch or less. The ore may or may not be subjected to a preliminary roasting or sintering. In the case of relatively pure ores such as stream tin, such preliminary treatment is not necessary, nor is it necessary with some grades of Bolivian ores and some classes of concentrates from Bolivian ores. But in other cases such as Bolivian ores carrying a high percentage of sulphur, for example, such preliminary roasting or sintering is desirable. This step of the process may be carried out in any well known or standard apparatus commonly used for pre-roasting or sintering operations.

The ore, according to my process, is then heated to a temperature above the reducing point of tin but below the reducing point of iron. This operation is carried on in a closed furnace or receptacle from which the air may be excluded.

The tin bearing material is then subjected to the action of a reducing gas which will combine with the tin oxides contained in the ore and reduce the same to metallic tin. Hydrogen gas is a well known reducing agent but the cost of this gas prohibits its use on a commercial scale except in special cases. Preferably I employ producer gas or illuminating gas which I have discovered combines readily to reduce the oxides of tin and which can be obtained at relatively low cost. It is well known that the oxides of tin are relatively stable compounds, but I have found they give up oxygen readily in the presence of either producer gas or illuminating gas to reduce the tin to its metallic form.

The time required to reduce a given quantity of material depends somewhat upon the temperature of the material and the composition of the reducing gas, as well as the conditions under which the gas is brought into contact with the ore. If a considerable tonnage of ore or concentrates is treated some mechanical agitation of the ore or a forced circulation of the gas is desirable in order to subject each particle to the action of the gas as rapidly as possible, and to insure a complete reduction of the tin compounds. Such agitation of the ore may be produced by mechanical means or the gas may be driven through the ore by a pump or pressure may be produced in any other well known manner.

In the accompanying drawing two forms of apparatus are shown diagrammatically that may be used in carrying out my process in which—

Figures 1 and 2 represent a longitudinal sectional view and a cross sectional view respectively of a furnace of the reverberatory type; and Figures 3 and 4 represent a longitudinal sectional view and a cross sectional view respectively of a furnace of the tilting type in which the ore may be heated electrically.

Referring to Figures 1 and 2 the ore is placed on the hearth of the reducing chamber A through a charging port B and is heated from the combustion chamber E. Suitable tap holes C and gas ports D may be provided in any well known manner.

In this construction it is obvious that the wall E' of the combustion chamber could be opened and the charge first heated by direct contact of the flame which is more economical than heating the charge by reflected heat. After reaching the desired temperature the wall could be closed and the gas admitted to the reduction chamber.

Referring to Figures 3 and 4 the shell is mounted to move, for example, on rollers G. The ore is introduced through charging port H and is heated by a current passing through electrodes K. The gas may be admitted through port L and discharged through the port J. It is obvious that by using tuyères instead of or in addition to the gas ports the gas can be passed up through the charge.

By means of this process the tin may be reduced directly from the ore without the expense involved in reverberatory or blast furnace operation. The percentage of tin contents recovered from the ore is very high and the tin is of usual purity. The loss of tin through the formation of an iron alloy requiring extensive subsequent treatment to recover the tin is entirely avoided. Likewise the loss of tin in the slag that is produced by ordinary furnace practice which always carries some tin even after it has been subjected to several treatments, is eliminated. The residues remaining after separation of the tin are in better condition to be treated for the recovery of the remaining values, if any, than before.

Although I have shown and described, and have outlined in the annexed claims, certain features of my invention, it will be understood that various omissions, substitutions and changes in the several steps of my process and in its operation and in the form and details of the apparatus may be made by those skilled in the art without departing from the spirit of the invention.

While certain preferred limits of temperature have been outlined, it is obvious that the essential range of temperature is between the reducing point of tin and the reducing point of iron since the process is primarily a fractional reduction whereby the tin compounds are reduced and the iron compounds are not.

Having thus described my invention, I claim:

1. In the art of separating tin from ores, concentrates and by-products containing compounds of tin, iron and other elements, the process which consists in crushing the ore into relatively small particles, heating the same in a closed receptacle to a temperature above the reducing point of tin and below the reducing point of iron, subjecting the particles to the action of a gas adapted to react chemically with tin oxides and reduce the same, removing the tin liberated by such reaction, and then treating the residue to recover the metals therein.

2. In the art of separating tin from ores, concentrates and by-products containing iron and other minerals, the process which consists in crushing the ore into small particles, heating the same in a closed receptacle to a temperature above the reducing point of the tin and below the reducing point of iron, subjecting said heated ore particles to the action of a reducing gas containing hydrogen and simultaneously agitating said ore particles.

3. In the art of recovering metallic tin from tin ore containing iron compounds, the process which consists in crushing the ore, heating the same to a temperature above the melting point of tin while confined in a closed receptacle, and forcing a reducing gas under pressure through said heated ore.

4. In the art of recovering metallic tin from tin ore containing iron and other substances, the process which consists in heating the ore in a closed receptacle to a temperature above the melting point of tin and below the melting point of iron, and forcing a reducing gas through said ore.

5. In the art of extracting tin from tin ores containing iron and other substances, the process which consists in heating the ore in a closed receptacle to a temperature above the reducing point of tin and below the reducing point of iron, subjecting said ore in a heated condition to a reducing gas, causing said gas to circulate through the ore.

Signed at Perth Amboy, in the county of Middlesex and State of New Jersey, this 31st day of March, A. D. 1919.

JAMES R. STACK.